| United States Patent [19] | [11] Patent Number: 4,882,375 |
|---|---|
| Tyrell et al. | [45] Date of Patent: Nov. 21, 1989 |

[54] POLYESTERS WITH MODIFIED MELT VISCOSITY

[75] Inventors: John A. Tyrell, Dalton, Mass.; Lawrence R. Wallace, Evansville, Ill.

[73] Assignee: General Electric Company, Mt. Vernon, Ind.

[21] Appl. No.: 239,601

[22] Filed: Sep. 1, 1988

[51] Int. Cl.$^4$ .............................................. C08L 67/02
[52] U.S. Cl. .................................... 524/161; 524/157; 524/166
[58] Field of Search ....................... 524/161, 166, 157

[56] References Cited

U.S. PATENT DOCUMENTS 3,915,926 10/1975 Wambach ............................ 524/411
4,581,398 4/1986 Droscher ............................ 524/161

Primary Examiner—Patricia Short
Attorney, Agent, or Firm—William F. Mufatti; Daniel DeJoseph

[57] ABSTRACT

The melt viscosity of polyesters is modified by adding thereto a minor amount of a sulfonated salt of a carboxylic acid.

12 Claims, No Drawings

POLYESTERS WITH MODIFIED MELT VISCOSITY

BACKGROUND OF THE INVENTION

High molecular weight polyesters and particularly polyesters and copolyesters of glycols and terephthalic or isophthalic acid have been available for a number of years. These are described inter alia in Whinfield et al, U.S. Pat. No. 2,465,319 and in Pengilly, U.S. Pat. No. 3,047,539. These patents disclose that the polyesters are particularly advantageous as film and fiber-formers.

For certain applications, such as injection or extrusion, and blow molding or blown film extrusions, it is desirable to use polyester resins that have lower melt viscosity. In addition, certain polyesters are known to interact with selected additives, for instance, aromatic carbonates and (poly-) carbonates during compounding to give very high molecular weight/melt viscosity products Such carbonate species may include, e.g., decabromodiphenyl carbonate, copolycar bonates of bisphenol-A and tetrabromobisphenol-A, bisphenol-A polycarbonate, tetrabromobisphenol polycarbonate, and the like. Increase in melt viscosity is particularly undesirable when the polyester is compounded with bisphenol-A (BPA)-tetrabromo BPA copolycarbonate (flame retardant), and $Sb_2O_3$ (synergistic flame retardant additive) that, unavoidably, also act as a catalyst in the linear polyesterpolycarbonate reaction. Prior art methods are known to prevent the build up in melt viscosity in such high molecular weight polyesters. One such method is to add carboxylic acids, such as isophthalic acid, to the polyesters. Although this technique is very effective in reducing the melt viscosity of the resulting composition, the carboxylic acids, and particularly isophthalic acid, being volatile, tend to "plate out" on the mold; that is, they tend to, after continuous molding operations, form an undesirable residue on the mold surface.

DESCRIPTION OF THE INVENTION

It has now been discovered that carboxylic acids that contain a sulfonate salt functionality are effective in modifying, which, for the purposes of this application, means lowering the melt viscosity of polyesters and, in addition, do not have the volatility, and thus do not have the plate-out problems, of unmod lower the viscosity of the polyester compositions of the present invention are sulfonated salt derivatives of carboxylic acids that have the formula R(COOH)x, wherein R is (a) an alkyl group having from about one to about twenty carbon atoms or (b) an aryl group; and x is 1 or 2. Exemplary of carboxylic acids which may be utilized in this invention are isophthalic acid, phthalic acid, terephthalic acid, benzoic acid, oleic acid, homophthalic acid, o-, m-, and p- phenylenediacetic acid; the polynuclear aromatic acids such as diphenic acid, and 1,4 naphthalic acid.

The sulfonated salt derivatives of carboxylic acid that are used in this invention may be employed in any effective range in which they can modify the melt viscosity of the resulting composition. Preferably, small amounts are utilized, for example, at a range of from about 0.01% to about 15% by weight of the total composition. A particularly preferred range is from about 0.1% to about 5% by weight of the total composition. These sulfonated salt derivatives are commercially available or can be prepared by methods well known to those skilled in the art.

The preferred higher molecular weight polyesters utilized in the present invention are linear polymeric glycol esters of terephthalic acid and isophthalic acids. They can be prepared by known techniques such as by the alcoholysis of esters of phthalic acid with a glycol and subsequent polymerization, by heating glycols with the free acids or with halide derivatives thereof, and similar processes. These are described in U.S. Pat. Nos. 2,465,319 and 3,047,539, and elsewhere. In addition to the phthalates, amounts, e.g., from about 0.5 to 15% by weight, of other aromatic dicarboxylic acids, such as naphthalene dicarboxylic acid, can be present in the polyester component. Although the term "linear" is used, the reactants can also include amounts of tri- or polyfunctional branching agents, such as trimethylolpropane, pentaerythritol, and trimethyl trimesate. Such polyesters will be modified according t the present invention by admixing therewith a non-volatile sulfonate salt of a carboxylic acid.

Preferred polyesters will be of the family consisting of high molecular weight, polymeric glycol terephthalates or isophthalates having repeating units of the general formula:

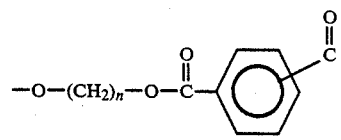

wherein n is a whole number of from 2 to 10, preferably from 2 to 4, and mixtures of such esters, including copolyesters of terephthalic and isophthalic acids of up to about 30 mole % isophthalic units. Especially preferred polyesters are poly(ethylene terephthalate) and poly(1,4-butylene terephthalate). In a preferred feature of this invention, additives comprising an aromatic (poly-) or (copoly-) carbonate will be added to the melt viscosity stabilized polyesters prepared according to this invention, and the resulting compositions will have substantially improved processability. The composition can also contain flame retardant additives. Such additives can include halogenated aromatic poly-or copolycarbonates or or oligomers thereof.

Illustrative flame retardant additives of this type are disclosed in U.S. Pat. Nos. 3,915,926 and 3,671,487 which are hereby incorporated by reference. They can be used alone or admixed with synergists, such as antimony compounds, e.g., antimony oxide. The amount of halogenated aromatic (homopoly-) or (copoly-) carbonate flame retardant additive used is not critical to the invention, so long as it is present in a minor proportion based on said composition—major proportions will detract from physical properties—but at least sufficient to render the block polyester resin non-burning or self-extinguishng. Those skilled in the art are aware that the amount will vary with the nature of the resin and with the efficiency of the additive. In general, however, the amount of additive will be from 0.5 to 50 parts by weight per 100 parts of resin. A preferred range will be from about 3 to 40 parts and an especially preferred range will be from about 8 to 40 parts of additive per 100 parts of resin. Effective amounts of synergists, e.g., antimony (III) oxide, may also be used. Among the typical flame retardant additives are those consisting of aromatic polycarbonates having repeating units of the formula:

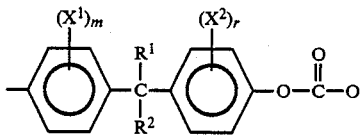

wherein the repeating units may be all the same or may be different, and wherein $R^1$ and $R^2$ are hydrogen, lower alkyl or phenyl, $X^1$ and $X^2$ are bromo or chloro and m and r are from 0 to 4, with the provision that at least some of the repeating units contain chloro or bromo moieties. These materials may be prepared by techniques well known to those skilled in the art. Preferred are aromatic (copoly-) -carbonates in which from 25 to 75 weight percent of the repeating units comprise chloroor bromo-substituted dihydric phenol, and the balance are unsubstituted dihydric phenol, e.g., bisphenol-A units. See, e.g., A. D. Wambach, U.S. Pat. No. 3,915,926. The additives can be intimately blended in a number of procedures. In one way, the flame retardant additive is put into an extrusion compounder with the dry polyester resin and the blend is heated at an elevated temperature, e.g., 450°–550° F., and extruded to produce molding pellets. The additive compound or compounds are dispersed in the molten polyester resin by the process. In another procedure, the flame retardant compound(s) is mixed with the polyester resin by blending at ordinary temperatures, then the blend is fluxed on a mill, heated, e.g., at 450°–550° F., cooled and chopped. The flame retardant compound(s) can also be mixed with the powdered or granular polyester and the mixture can be heated and directly formed into blow molded items using machines which compound and mold. It shold be understood that the polyesters modified by the salt derivatives of carboxylic acid according to this invention are useful as melt viscosity stabilized components and may contain one or more conventional additives such as, for example, aromatic polycarbonates, other flame retardants, antioxidants, carbon black, reinforcing agents, plasticizers, lubricity promoters, color stabilizers, UV absorbers, X-ray opacifiers, dyes, pigments, fillers, mold release agents such as polyethylene, standard drip inhibitors, and the like, all of which are well known to those skilled in the art. Satisfactory thermal, oxidative and/or UV stabilizers comprise phosphorous containing stabilizers, phenols and their derivatives, amines and their derivatives, compounds containing both hydroxyl and amine groups, hydroxyazines, oximes, polymeric phenolic esters and salts of multivalent metals in which the metal is in its lower state. Representative phenol derivatives useful as stabilizers include 3,5-di-tert-butyl-hydroxy hydrocinnamic triester with 1,3, 5-tris-(2-hydroxyethyl-s-triazine-2,4,6-(1H,3H, 5H) trione; 4,4'bis (2,6-ditertiary-butylphenol); 1,3,5-trimethyl-2,4,6-tris-(3,5-ditertiary-butyl-4-hydroxylbenzyl)benzene and 4,4'-butylidene-bis(6-tertiary-butyl-m-cresol). Various inorganic metal salts or hydroxides can be used as well as organic complexes such as nickel dibutyl dithiocarbamate, manganous salicylate and copper 3-phenylsalicylate. Typical amine stabilizers include N,N'-bis (beta-naphthyl)-p-phenylenediamine; N,N'-bis(l-methylheptyl)-p-phenylenediamine and either phenyl-beta-napththyl amine or its reaction products with aldehydes. Mixtures of hindered phenols with esters or thiodipropionic, mercapides and phosphite esters are particularly useful. Additional stabilization to ultraviolet light can be obtained by compounding with various UV absorbers such as substituted benzophenones and/or benzotriazoles.

Particularly useful antioxidants are hindered phenols which include phenols of the formula

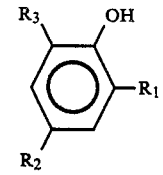

wherein $R_1$ and $R_3$ are hydrocarbon group having from 1 to about 20 carbon atoms, and $R_2$ is a hydrogen atom or a hydrocarbon group having from one to about 20 carbon atoms; and bisphenol of the formula

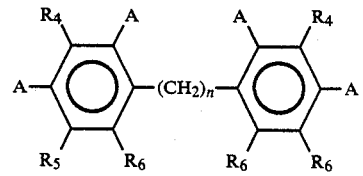

wherein $R_4$, $R_5$ and $R_6$ are each a hydrogen atom or a hydrocarbon group having from one to about 20 carbon atoms, one of the two A's on each ring is a hydroxyl group and the other A on each ring is a hydrogen atom or a hydrocarbon group having from one to about 20 carbon atoms; and n is an integer of from 0 to about 20. Preferred hindered phenols useful in this invention include 2,6-di-tert-butyl-4-methyl-phenol, commonly known as BHT (sold under the tradename Ionol ® by Shell Chemical Co.); 4,4-methylene bis(2,6-di-tert-butylphenol) and 2,6-di-tert-butyl-4-n-butylphenol (sold under the tradename Ethyl 702 and Ethyl 744, respectively, by Ethyl Corp.); and tetrakis[methylene 3-(3',5'-di-tert-butyl-4'-hydroxyphenyl) proprionate]methane and stearyl-3-(3',5'-di-tertbutyl-4'-hydroxyphenyl) proprionate (sold under the tradenames Irganox 1010 and Irganox 1076, respectively, by Ciba-Geigy). In certain preferred features the composition of the present invention will include reinforcing fillers such as fibrous (filamentous) glass and/or mineral fillers, such as clay, mica, talc and the like. The fillers can be untreated or treated with silane or titanate coupling agents, etc. The filamentous glass to be employed as reinforcement in such embodiments of the present compositions is well known to those skilled in the art and is widely available from a number of manufacturers. For compositions ultimately to be employed for electrical uses, it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastic reinforcements are made by mechanical pulling. The filament diameters range from about 0.00012 to 0.00075 inch, but this is not critical to the present invention. The length of the glass filaments is also not critical to the invention. However, in preparing the molding compositions, it is convenient to use the filamentous glass in the form of chopped strands of from about one-eighth to about two inches long. In articles molded from the compositions, on the other hand, even shorter lengths will be encountered because, during compounding considerable fragmentation will occur. This is desirable, however, because the best properties are exhibited by thermoplastic injection molded articles in which the filament lengths lie between about 0.0005 to 0.250 inch.

DESCRIPTION OF THE PREFERRED EMBODIMENTS

The following examples illustrate the invention.

They are set forth as a further description but are not to be construed as limiting the invention thereto. The melt viscosity of the compounded polyesters are measured in a Tinius-Olsen extrusion plastometer. In the examples all parts and percentages are on a weight basis unless otherwise specified. All compositions were prepared by dry blending the ingredients followed by extrusion with a Prodex single screw extruder at approximately 470°. Examples 1,4,6 and 8 are outside the scope of the present invention and illustrate prior art compositions which do not contain the sulfonated carboxylic acid modifier. The composition and properties of Examples 1-5 are set forth in Table I and the composition and properties of Examples 6-9 are set forth in Table II.

TABLE I

| COMPOSITION | PARTS BY WEIGHT | | |
|---|---|---|---|
| | Example 1 | Example 2 | Example 3 |
| PBT | 56.15 | 56.05 | 56.05 |
| Glass Fibers | 30 | 30 | 30 |
| Flame Retardant | 13.2 | 13.2 | 13.2 |
| Hindered Phenol Antioxidant | 0.15 | 0.15 | 0.15 |
| Drip Inhibitor | 0.3 | 0.3 | 0.3 |
| 5-Sulfoisophthalic Acid (Sodium Salt) | — | 0.1 | — |
| Mold Release Agent | 0.2 | 0.2 | 0.2 |
| m-sulfobenzoic acid sodium salt | — | — | 0.1 |
| Melt viscosity at 482° F. (poise) | 8510 | 7450 | 8240 |

TABLE II

| COMPOSITION | PARTS BY WEIGHT | |
|---|---|---|
| | Example 4 | Example 5 |
| PBT | 56.15 | 55.65 |
| Glass Fibers | 30 | 30 |
| Flame Retardant | 13.2 | 13.2 |
| Hindered Phenol Antioxidant | 0.15 | 0.15 |
| Drip Inhibitor | 0.3 | 0.3 |
| 5-Sulfoisophthalic Acid (Sodium Salt) | — | 0.5 |
| Mold Release Agent | 0.2 | 0.2 |
| m-sulfobenzoic acid sodium salt | — | — |
| Melt viscosity at 482° F. (poise) | 9530 | 7080 |

TABLE III

| COMPO-SITION | PARTS BY WEIGHT | | | |
|---|---|---|---|---|
| | Example 6 | Example 7 | Example 8 | Example 9 |
| PBT | 99.85 | 99.35 | 50.00 | 50.00 |
| PC | — | — | 49.55 | 49.05 |
| SA | — | 0.5 | — | 0.50 |
| HPO | 0.15 | 0.15 | 0.15 | 0.15 |
| STAB | — | — | 0.3 | 0.3 |
| N.I. | 1.1 | 1.1 | 1.8 | 1.5 |
| Sp. Gr. | 1.313 | 1.314 | 1.254 | 1.254 |
| M.V. at 482° F. | 17,040 | 12,880 | 12,590 | 8,610 |
| M.V. at 510° F. | 9,370 | 8,240 | 8,210 | 5,880 |

The flame retardant used in Examples 1-9 was a concentrate comprising tetrabromo bisphenol A oligomeric carbonate and antimony oxide.

PBT is poly (1,4 butylene terephthalate) resin from General Electric Company (Valox ® 295). Different batches of PBT resin were used for examples 1-3; 4-5; and 6-9.

STAB is a phosphorous containing stabilizer.

SA is 5-Sulfoisophthalic Acid (Sodium Salt).

HPO is a hindered phenol antioxidant.

PC is bisphenol A polycarbonate resin from General Electric Company (Lexan ® 141).

What is claimed is:

1. A polyester composition comprising a polyester resin and a melt viscosity lowering amount of a sulfonate salt of a carboxylic acid which has the formula $R(COOH)_x$, wherein R is an alkyl group having from about 1 to about 20 carbon atoms or an aryl group, and x is 1 or 2.

2. The composition of claim 1 wherein the polyester resin is a high molecular weight linear thermoplastic polyester resin selected from the group consisting of polymeric glycol terephthalate and isophthalate esters having repeating units of the general formula:

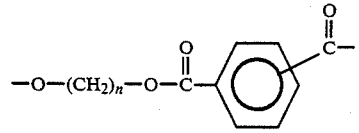

wherein n is a whole number of from 2 to 10, or a mixture of such esters.

3. The composition as defined in claim 2 wherein the polyester is a poly ester.

4. The composition as defined in claim 3 wherein the polyester is poly.

5. The composition as defined in claim 2 wherein the polyester is poly ester.

6. The composition as defined in claim 1 wherein the carboxylic acid is isophthalic acid.

7. The composition of claim 1 wherein the carboxylic acid is benzoic acid.

8. The composition of claim 1 which further comprises an aromatic polycarbonate.

9. The composition of claim 8 which further comprises at least one flame retardant.

10. The composition of claim 9 wherein the flame retardant is an halogenated aromatic polycarbonate or oligomer thereof.

11. The composition of claim 1 wherein the sulfonated salt of a carboxylic acid is present in an amount that ranges from about 0.01% to about 15% by weight of the total composition.

12. The composition of claim 11 wherein the sulfonated salt of a carboxylic acid is present in an amount that ranges from about 0.1% to about 5% by weight of the total composition.

* * * * *